(No Model.)
A. C. BURNER.
SAW.
No. 392,534. Patented Nov. 6, 1888.
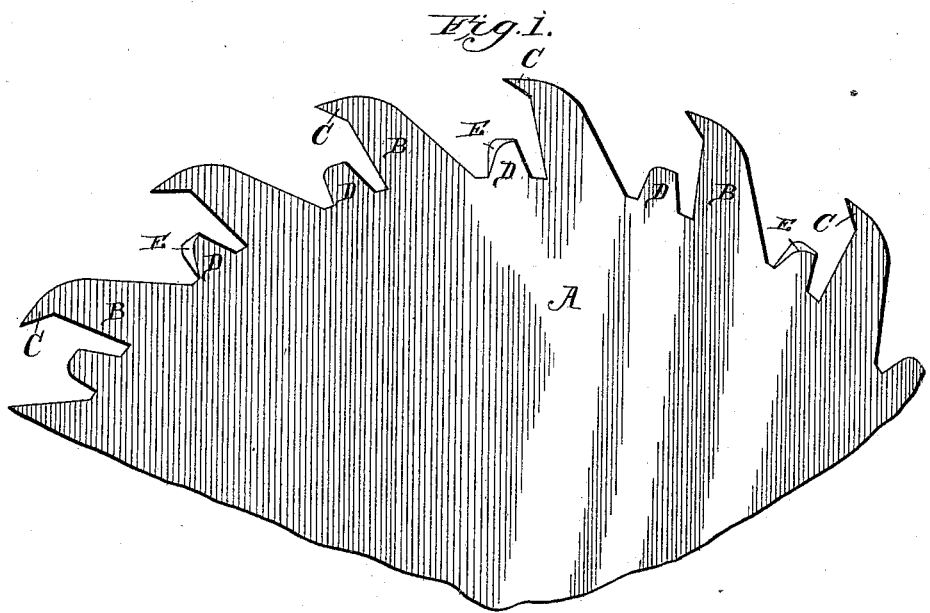
Witnesses.
Henry G. Dietrich
J. W. Garner
Inventor,
Allen C. Burner.
By his Attorneys

United States Patent Office.

ALLEN CRAGE BURNER, OF GREEN BANK, ASSIGNOR OF ONE-HALF TO H. A. HOLT AND ALEXANDER F. MATHEWS, OF LEWISBURG, WEST VIRGINIA.

SAW.

SPECIFICATION forming part of Letters Patent No. 392,534, dated November 6, 1888.

Application filed May 26, 1888. Serial No. 275,256. (No model.)

*To all whom it may concern:*

Be it known that I, ALLEN CRAGE BURNER, a citizen of the United States, residing at Green Bank, in the county of Pocahontas and State of West Virginia, have invented a new and useful Improvement in Saws, of which the following is a specification.

My invention relates to an improvement in saw-teeth; and it consists in the peculiar construction and arrangement of devices, that will be more fully set forth hereinafter, and particularly pointed out in the claim.

The object of my invention is to provide a saw with peculiarly-shaped teeth, which are adapted to plane the boards or material at the same time that the same is sawed, and thus effect an economy of material and lessen the cost of the finished product.

In the accompanying drawings, Figure 1 is a side elevation of a portion of a circular saw embodying my improvements. Fig. 2 is an edge view of the same.

A represents the body of the saw, and B represents the saw-teeth, which are arranged at suitable distances apart, are in the same plane—that is to say, the saw-teeth are not set or inclined in opposite directions alternately—and the said saw-teeth are provided at their outer ends with forwardly-extending points C, that are substantially V-shaped and have their inner edges inclined. Said points thus form salient angles at the outer ends of the teeth B, and are arranged at substantially right angles to said teeth. Midway between each pair of saw-teeth is a tooth, D, which has its front edge curved and beveled on one side, as shown, and is thereby provided with a cutting-edge, E. The said teeth D, which are shorter than the teeth B, have their front edges beveled in opposite directions alternately, as shown in Fig. 2.

In the operation of my improved saw the teeth B serve to sever the boards or material in the usual manner, and the teeth D serve to trim or plane the sides of the kerf made by the saw-teeth and thereby plane the boards or material, so that the same comes from the saw in a finished condition and needs no subsequent planing before being placed on the market. The teeth D also perform a useful function in clearing out the sawdust between the teeth B and preventing the latter from becoming clogged, thus rendering the saw exceedingly easy to operate.

Having thus described my invention, I claim—

The saw having the teeth B arranged in the same plane therewith, and provided with the forwardly-extending V-shaped points C, said points forming salient angles, and being arranged at substantially right angles to the teeth B, and the shorter teeth D arranged alternately with the teeth B, said teeth D being also in the same plane with the saw and being beveled or sharpened at their front edges on opposite sides alternately, substantially as described.

In testimony that I claim the foregoing as my own I have hereto affixed my signature in presence of two witnesses.

ALLEN CRAGE BURNER.

Witnesses:
 H. A. YEAJER,
 C. O. ARBOGAST.